United States Patent
Grant

(10) Patent No.: US 9,980,012 B2
(45) Date of Patent: *May 22, 2018

(54) APPARATUS, SYSTEMS AND METHODS FOR DISTRIBUTION OF ADDRESSABLE CONTENT

(71) Applicant: EchoStar Technologies L.L.C., Englewood, CO (US)

(72) Inventor: John Grant, Centennial, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/593,843

(22) Filed: May 12, 2017

(65) Prior Publication Data

US 2017/0251279 A1 Aug. 31, 2017

Related U.S. Application Data

(63) Continuation of application No. 14/838,671, filed on Aug. 28, 2015, now Pat. No. 9,654,841.

(51) Int. Cl.
| | |
|---|---|
| *H04N 5/445* | (2011.01) |
| *H04N 21/81* | (2011.01) |
| *H04N 21/258* | (2011.01) |
| *H04N 21/262* | (2011.01) |
| *H04N 21/433* | (2011.01) |
| *H04N 21/45* | (2011.01) |
| *H04N 21/458* | (2011.01) |
| *H04N 21/466* | (2011.01) |
| *H04N 21/854* | (2011.01) |
| *G06Q 30/02* | (2012.01) |
| *H04N 21/44* | (2011.01) |

(52) U.S. Cl.
CPC ....... *H04N 21/812* (2013.01); *G06Q 30/0255* (2013.01); *H04N 21/25891* (2013.01); *H04N 21/262* (2013.01); *H04N 21/4331* (2013.01); *H04N 21/458* (2013.01); *H04N 21/4532* (2013.01); *H04N 21/4667* (2013.01); *H04N 21/85406* (2013.01); *H04N 21/44004* (2013.01)

(58) Field of Classification Search
CPC .................................................. H04N 21/4331
USPC ......................................................... 725/42
See application file for complete search history.

(56) References Cited

U.S. PATENT DOCUMENTS

| | | |
|---|---|---|
| 4,607,346 A | 8/1986 | Hill |
| 5,721,827 A | 2/1998 | Logan et al. |
| 5,758,257 A | 5/1998 | Herz et al. |

(Continued)

FOREIGN PATENT DOCUMENTS

| | | |
|---|---|---|
| WO | 0169929 | 9/2001 |
| WO | 2014004955 | 1/2014 |

*Primary Examiner* — Michael Hong
(74) *Attorney, Agent, or Firm* — Lowe Graham Jones PLLC

(57) ABSTRACT

Systems and methods are operable to distribute targeted assets to a plurality of media devices. An exemplary embodiment generates an asset file defined by an asset file time period, wherein target assets are selected for saving into the asset file when the intended initial presentation time of a target asset falls within the asset file time period of the asset file that is being generated. Then, the asset file is communicated to a plurality of media devices at a time in advance of the intended initial presentation times of a target asset of the asset file.

19 Claims, 3 Drawing Sheets

(56) References Cited

U.S. PATENT DOCUMENTS

| | | |
|---|---|---|
| 5,774,170 A | 6/1998 | Hite et al. |
| 6,029,045 A | 2/2000 | Picco et al. |
| 6,067,107 A | 5/2000 | Travaille et al. |
| 6,876,974 B1 | 4/2005 | Marsh et al. |
| 8,719,090 B2 | 5/2014 | Lewis |
| 2003/0208560 A1* | 11/2003 | Inoue .................... G06Q 20/20 709/219 |
| 2005/0081252 A1 | 4/2005 | Chefalas et al. |
| 2010/0251289 A1 | 9/2010 | Agarwal et al. |
| 2011/0167486 A1* | 7/2011 | Ayloo ................... G06Q 10/00 726/7 |
| 2013/0060631 A1* | 3/2013 | Corson ............. G06Q 30/0241 705/14.46 |
| 2014/0279026 A1 | 9/2014 | Nath et al. |

\* cited by examiner

| | 222 | 224 | 226 | 228 |
|---|---|---|---|---|
| 204 → | ASSET ID-1 | DATE $i$ | ASSET 1 CONTENT | ASSET 1 ATTRIBUTES |
| 206 → | ASSET ID-2 | DATE $i$ | ASSET 2 CONTENT | ASSET 2 ATTRIBUTES |
| 208 → | ASSET ID-3 | DATE $i-1$ | ASSET 3 CONTENT | ASSET 3 ATTRIBUTES |
| 210 → | ASSET ID-4 | DATE $i$ | ASSET 4 CONTENT | ASSET 4 ATTRIBUTES |
| 212 → | ASSET ID-5 | DATE $i+1$ | ASSET 5 CONTENT | ASSET 5 ATTRIBUTES |
| 214 → | ASSET ID-6 | DATE $i+2$ | ASSET 6 CONTENT | ASSET 6 ATTRIBUTES |
| 216 → | ASSET ID-7 | DATE $i+1$ | ASSET 7 CONTENT | ASSET 7 ATTRIBUTES |
| 218 → | ASSET ID-8 | DATE $i$ | ASSET 8 CONTENT | ASSET 8 ATTRIBUTES |
| 220 → | ASSET ID-$x$ | DATE $i$ | ASSET $x$ CONTENT | ASSET $x$ ATTRIBUTES |

ASSET BUFFER 144

FIG. 2

| | 222 | 224 | 226 | 228 |
|---|---|---|---|---|
| 204 → | ASSET ID-1 | DATE $i$ | ASSET 1 CONTENT | ASSET 1 ATTRIBUTES |
| 206 → | ASSET ID-2 | DATE $i$ | ASSET 2 CONTENT | ASSET 2 ATTRIBUTES |
| 210 → | ASSET ID-4 | DATE $i$ | ASSET 4 CONTENT | ASSET 4 ATTRIBUTES |
| 218 → | ASSET ID-8 | DATE $i$ | ASSET 8 CONTENT | ASSET 8 ATTRIBUTES |
| 220 → | ASSET ID-$x$ | DATE $i$ | ASSET $x$ CONTENT | ASSET $x$ ATTRIBUTES |

ASSET FILE $i$

FIG. 3

APPARATUS, SYSTEMS AND METHODS FOR DISTRIBUTION OF ADDRESSABLE CONTENT

PRIORITY CLAIM

This application is a Continuation of U.S. application Ser. No. 14/838,671, filed Aug. 28, 2015, granted as U.S. Pat. No. 9,654,841 on May 16, 2017, and entitled "APPARATUS, SYSTEMS AND METHODS FOR DISTRIBUTION OF ADDRESSABLE CONTENT," the contents of which is incorporated herein by reference in its entirety.

BACKGROUND

Media devices, such as a set top box, a stereo, a television, a computer system, a game system, or the like, are often configured to receive and/or present various types of media content to a user. The media content may be received from a content service provider that is broadcasting the same media content to many media devices. The broadcast media content is typically provided to the receiving media devices via a content distribution system, wherein all of the media devices receive and/or have access to the same broadcasting media content. Non-limiting examples of such content distribution systems include satellite systems, cable system, and the Internet.

Typically, media content is theme based. Examples of such theme-based media content includes movies, films, serial programming, sporting events, documentaries, newscasts, religious programs, informative programs (typically of longer duration than a commercial having advertising content), or the like. Serial programming may present a continuing plot and/or theme, often with the same cast of actors, in a sequential episode-by-episode basis that is available periodically.

In many situations, advertising content (interchangeably referred to herein as an advertisement, a commercial, or the like) may be interspersed through a presented thematic media content event. As the user is viewing the presented thematic media content event on their media presentation device or their media device, from time to time, presentation of the thematic media content event is paused for a short duration (interchangeably referred to herein as a commercial break) so that the one or more advertisements are presented to the user. Typically, the advertisements are of a relatively short duration, such as a few seconds or a few minutes. After a conclusion of the presentation of the one or more advertisements during the commercial break, presentation of the thematic media content event resumes.

Advertising content is typically produced by a third party organization, such as an advertising agency, a product manufacturer, a product distributor, a charitable organization, or the like. Each target asset includes advertisement content or the like. Often, the advertisement is intended to influence a viewer to purchase a product, purchase a service, or perform some other act related to the advertisement subject matter.

The produced advertisement is provided to the content service provider prior to the intended time of presentation to the user. The content service provider then generates a stream of media content that includes the thematic media content interspersed with the advertisements inserted into the commercial breaks, which is then broadcast to the receiving media devices. Often, the third party (or another party paying for the production of the commercial) pays the content service provider for the insertion of their advertisements into the commercial breaks of one or more particular thematic media content events.

Recent advances in technology have resulted in new ways to selectively present particular advertisements to targeted (identified) users who are receiving a broadcast of a particular thematic media content event. One newly available technique of presenting advertising content to users who are viewing a particular broadcasted thematic media content event is to select a particular advertisement that is expected to be of a higher interest to the targeted viewing user.

Selection of a particular advertisement is based upon a matching of attributes of the advertisement with attributes of the targeted viewing user (interchangeably referred to herein as an asset attribute or an advertisement attribute). When a commercial break occurs during presentation of a thematic media content event, a particular advertisement targeted to a particular viewing user is then presented during the commercial break. Accordingly, different users who are viewing the same thematic content event can be presented different selected advertisements.

In such targeted advertisement systems, each individual advertisement is identifiable by a unique identifier such that an individual advertisement can be locally stored into a memory medium of the media device, and then later retrieved from the memory medium for presentation to the user. In an example targeted advertisement system, many different advertisements (along with their unique identifier) are communicated to the media device and then stored in a memory medium of the media device prior to the intended time of presentation to the user.

A listing of attributes associated with each particular advertisement may also be included with each stored advertisement. The advertisement attributes describe characteristics about the advertisement and/or about a user of interest that would be intended to be a viewer of that advertisement when presented during a commercial break.

Attributes pertaining to a particular user(s) of a media device may also be stored at the media device. User attributes describe one or more characteristic that describe and/or may be associated with that particular user, the user's location and/or account, the user's household, or other users residing at the household. User attributes may be defined remotely and then downloaded to and stored at the media device. Alternatively, or additionally, user attributes may be defined at the media device based on past user activities. For example, the media device may have a learning algorithm or the like is used to monitor user activities, and then define one or more user attributes (preferences, habits, etc.) based on the user's activities.

At some point in time prior to a commercial break, the targeted advertisement system selects particular targeted advertisements for presentation to particular viewing users based on a match between advertisement attributes and user attributes. The targeted advertisement system typically resides at the media device, but may reside remotely in some applications. Presumably, the third party who produced the targeted advertisement(s) has paid a service fee or the like to the content service provider to have their particular targeted advertisement(s) be considered as candidate targeted advertisements that are eligible for selection and presentation during a commercial break.

For example, a hypothetical automobile manufacturer may have produced an advertisement for a sports car, an advertisement for a family van, and an advertisement for a truck. The automobile manufacturer, upon payment or a fee to the content service provider, may have a scheduled block of time during a particular commercial break wherein one of their three example targeted advertisements will be presented to all viewing users. A first user may be a young professional with a relatively large amount of disposable income (user attributes: young, professional, disposable income). The sports car may have associated attributes of being desirable to younger affluent people (advertisement attributes: young buyers, high income). A second user may be a head of a family household with a moderate large amount of disposable income and several young children (user attributes: children, moderate income). The family van may have associated attributes of being desirable to families (advertisement attributes: parents with children). Finally, a third user may be a tradesman operating their own service business (user attributes: tradesman, service business). The truck may have associated attributes of being desirable to a tradesman (advertisement attributes: reliable service vehicle and utility vehicle). Thus, when all three users are viewing the same thematic media content event, and when the commercial break occurs, the first user will be presented the sports car advertisement, the second user will be presented the family van advertisement, and the tradesman will be presented the truck advertisement.

To support a targeted advertisement system, a large number of selectable targeted advertisements (interchangeably referred to herein as a targeted asset) are communicated to and saved into the many media devices that are receiving thematic media content from the content service provider. The large number of targeted advertisements must be communicated to and saved into the media devices in advance of the commercial breaks in which any particular targeted advertisement will be selected and then presented.

In a legacy targeted advertisement system, received targeted advertisements are received by the content service provider from various third party producers of the targeted advertisements. Received targeted advertisements are packaged into a group of assets, interchangeably referred to herein as a file, for broadcast or transmission to the receiving media devices. Each file may be packaged as a zip file to reduce the amount of transmission data. Typically, each zip file may include both a number of assets, for example one hundred or so assets as well as metadata identifying criteria and/or attributes for each of the assets contained in the asset file. Any number of such asset files may then be broadcast, typically in a serial fashion, for reception by the media devices that receive media content via the distribution network.

Each receiving media device receives every one of the zip files and stores them in its resident memory medium. As the plurality of assets are in a zipped or reduced storage format, the media devices are capable of storing many such zip files. The media devices then unzip each received zip file, and then store the much larger volume of individual targeted advertisements. Accordingly, the media device may have to save hundreds or even thousands of assets (targeted advertisements).

The media devices may then analyze the targeting criteria (advertisement attributes) of each targeted advertisement, and compare the targeted advertisement attributes to the stored user attributes. Such user attributes may include data about the media device including the specific geographic region in which the media device is located, demographic data of the household of the user in possession of the media device, viewing habits of the user's household, and/or personal characteristics of the user. In some embodiments, for targeted advertisement assets for which the stored targeted advertisement attributes matches the user attributes, the media device may maintain the stored matching assets, and then delete the other assets for which the targeted advertisement attributes do not match the particular user attributes for that media device. Accordingly, deletion of non-matching targeted advertisements may then free enough memory to open or unzip the next file of targeted advertisement assets. The process may be repeated until every targeted advertisement file has been analyzed and all applicable targeted advertisements have been stored.

Issues with such legacy targeted advertisement systems include requiring a very large number of read/write operations to be performed by the individual media devices. Then, each media device must store and review every targeted advertisement asset residing in the zip files that are distributed to it over the system. Distribution of the zip files with targeted advertisement assets typically occurs on a daily basis. Accordingly, the content service provider mast generate a large number of zip files with the targeted advertisement assets, and then communicate the large number of zip files to all of the media devices, thereby utilizing a large amount of computing bandwidth and a large amount of communication system bandwidth and/or capacity.

Additionally, the available memory capacity of the individual media devices is limited. Accordingly, a limited number of zip files may be stored/analyzed before the full utilization of the allocated memory capacity needed to unzip the file, store the unzipped targeted advertisement assets, as well as to store the other targeted advertisement assets and/or media content itself. In many such targeted advertisement systems, although thousands of targeted advertisement assets are distributed daily by the content service provider, only a hundred or so targeted advertisement assets may be applicable to any individual media device because the advertisement attributes of a limited number of distributed targeted advertisement assets match the user attributes associated with that particular media device. Accordingly, such legacy systems are both inefficient in the excessive read/write operations performed by the content service provider and the receiving media devices, as well as the large amount of transmission bandwidth and transmission capacity required to communicate the zipped files to the media devices over the communication system.

Accordingly, there is a need in the arts to reduce the daily number of read/write operations performed by the content service provider and the receiving media devices, as well as reduce the large amount of transmission bandwidth and transmission capacity required to communicate the large numbers of zip files to the media devices over the communication system.

SUMMARY

Systems and methods of distributing targeted assets to a plurality of media devices are disclosed. An exemplary embodiment is operable to distribute targeted assets to a plurality of media devices. An exemplary embodiment generates an asset file defined by an asset file time period, wherein target assets are selected for saving into the asset file when the intended initial presentation time of a target asset falls within the asset file time period of the asset file that is being generated. Then, the asset file is communicated to a plurality of media devices at a time in advance of the intended initial presentation times of a target assets of the asset file.

BRIEF DESCRIPTION OF THE DRAWINGS

Preferred and alternative embodiments are described in detail below with reference to the following drawings:

FIG. 2 conceptually illustrates a plurality of received target assets that are stored in the asset buffer;

FIG. 3 conceptually illustrates a plurality of target assets that are selected by the asset manager and then stored in an asset file.

DETAILED DESCRIPTION

Figure 1:
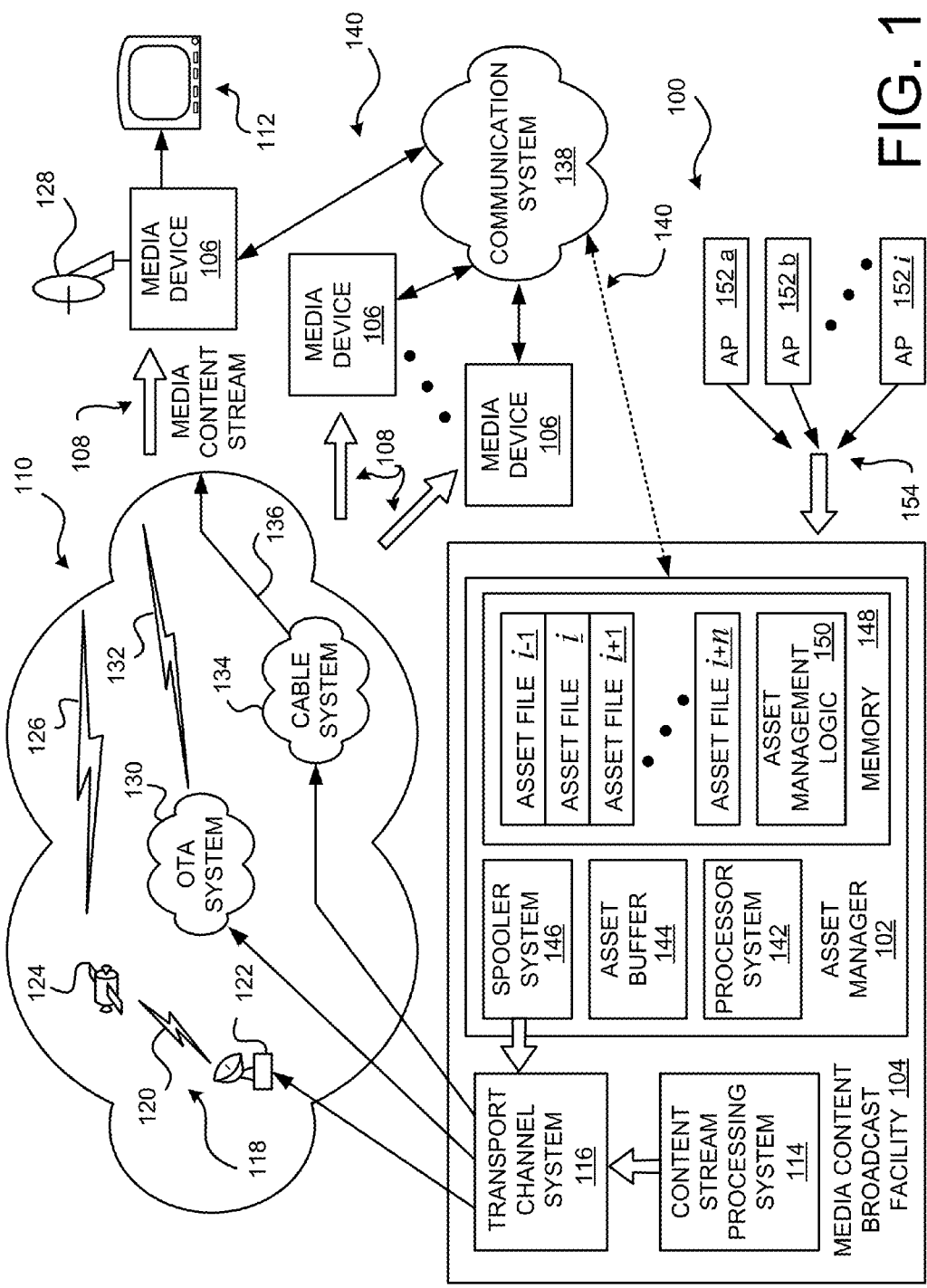
FIG. 1 is a block diagram of an embodiment of a targeted advertisement delivery system operating in a broadcast-based media content delivery and presentation environment.

FIG. 1 is a block diagram of an embodiment of a targeted advertisement delivery system 100 operating in a broadcast-based media content delivery and presentation environment. Embodiments of the targeted advertisement delivery system 100 are implemented in an asset manager 102, illustrated as residing at a media content broadcast facility 104. In alternative embodiments, the asset manager 102 may reside remotely from the media content broadcast facility 104. Additionally, or alternatively, the asset manager 102 may be integrated with and/or may reside in other asset and/or media content management facilities (not shown).

In practice, the asset manager 102 receives and stores targeted advertisements received from the third party producers. The asset manager 102, on a periodic basis, generates an asset file comprising a plurality of selected targeted advertisements. The plurality of targeted advertisements in the asset file are intended to be initially presented to a viewing user during some predefined upcoming period of time. For example, a plurality of targeted advertisements that are intended to be initially presented during a next upcoming twenty-four hour period are gathered together by the asset manager 102 at some point in time during the current twenty-four hour period. That is, the selected targeted advertisements have an intended initial presentation time that falls within an upcoming predefined period, here the next twenty-four hour period. Thus, a limited number of targeted advertisements can be selected from a very large pool of available targeted advertisements based on the intended initial presentation time of the targeted advertisement.

The asset manager 102 then creates one or more asset zip files using the selected targeted advertisements. If there number of selected targeted advertisements is relatively large, a plurality of different asset zip files may be generated, wherein each of the asset zip files contain different ones of the selected targeted advertisements.

The generated asset zip files are spooled to the media content broadcast facility 104. That is, the generated asset zip files are communicated to the media content broadcast facility 104 in a serial fashion one at a time (interchangeably referred to herein as "spooling").

The media content broadcast facility 104 then broadcasts the asset zip files, via a broadcast-based communication system 110, to a plurality of receiving media devices 106. Preferably, the asset zip files are serially communicated to the media devices 106 with a stream of thematic media content events that is also being broadcast to the media devices 106.

Accordingly, the media devices 106 each receive one or more media content streams 108 having a plurality of thematic media content events and the serially communicated asset zip files having the targeted advertisements therein. The targeted advertisements are unpacked from the received asset zip files and are then stored by the media device 106. The received asset zip files may be retained or deleted depending upon the particular configuration of the receiving media device 106.

When a particular media content event is being presented to a viewing user on components of a media presentation system 112, one or more commercial breaks may be predefined and interspersed within the media content event. If one of the commercial breaks has a time slot (time period) allocated for insertion of a targeted advertisement, then a relevant targeted advertisement may be selected by the media device 106 (based on a match between user attributes and the associated asset attribute, or the advertisement attribute, of the selected targeted advertisement). The selected targeted advertisement is then presented to the viewing user during the commercial break.

The targeted advertisement delivery system 100 is therefore able to identify and communicate a reduced number of targeted advertisements to the media devices 106 since only those particular targeted advertisements that are to be initially presented during the next upcoming time period are transmitted from the media content broadcast facility 104. Other targeted advertisements that are intended to be initially presented at a later time (after the next upcoming predefined period, interchangeably referred to as a next upcoming time period) are not communicated to the plurality of media devices 106.

An unexpected benefit provided by embodiments of the targeted advertisement delivery system 100 is that communication bandwidth and/or capacity over the broadcast-based communication system 110 is reduced since fewer and/or smaller asset zip files are communicated to the media device 106 (as compared to legacy targeted advertisement systems that communicate a larger number of targeted advertisements). Further, less processing capacity is needed by the asset manager 102 since a limited number of targeted advertisements are packaged into the generated asset zip files (as compared to legacy targeted advertisement systems that process a larger number of targeted advertisements into zip files). And, less processing capacity is required at each of the plurality of media devices 106 since a limited number of targeted advertisements are received in the communicated asset zip files (as compared to legacy targeted advertisement systems that communicate a larger number of targeted advertisements in zip files to the media devices 106). Additionally, less memory capacity is required at each of the media devices 106 for storage of the limited number of received targeted advertisements which are intended to be initially presented over the next upcoming time period.

For an exemplary comparison, a legacy targeted advertisement delivery system may process targeted advertisements spanning a two week period. The legacy targeted advertisement delivery system simply provides targeted advertisements to the media devices 106 as the targeted advertisements are received from the third party advertisement producers. Many hundreds of targeted advertisements, or even thousands of targeted advertisements, are typically provided to the content service provider two or more weeks in advance of their respective intended presentation time (time of use as a targeted advertisement).

For example, a particular asset producer may create a plurality of different but related targeted advertisements, such as during a particular advertising campaign that may have a predefined start time and a predefined end time or predefined duration. Some of the targeted advertisements may have intended initial presentation times that correspond to the beginning of the advertising campaign, while other ones of the targeted advertisements are intended to be presented at later times during the advertisement campaign. A legacy system would communicate all of the received targeted advertisements, which may number in the thousands for any particular advertisement campaign, to the media devices 106.

In contrast, an embodiment of the targeted advertisement delivery system 100 communicates a limited of targeted advertisements that are intended to be initially presented over the next upcoming time period, such as, but not limited to, a twenty-four hour period. Accordingly, the targeted advertisement delivery system 100 is communicating only five to ten percent of the number of targeted advertisements that are otherwise communicated by the legacy system (which communicate the larger number of targeted advertisements spanning a two week time period, for example). Here, the reduction in the volume and/or numbers of targeted advertisements is between five to ten percent of the previous legacy volume and/or numbers of targeted advertisements, and thereby results in a decrease in bandwidth and capacity utilization of the broadcast-based communication system 110, reduces processing capacity at the asset manager 102 and at the plurality of media devices 106, and reduces memory capacity at the plurality of media devices for storage of received targeted advertisements.

To facilitate disclosure of an exemplary embodiment of the targeted advertisement delivery system 100, delivery of media content events to the plurality of media devices 106 are briefly described. A media content provider managing the media content broadcast facility 104 receives media content, typically in the form of a plurality of media content events, from a plurality of local program content providers or other content providers. The provided media content events may include, but are not limited to, a television program, a newscast, a broadcast sports event, a movie, informative programs (typically of longer duration than a commercial having advertising content), or the like. The media content events are typically provided in the form of a video stream, a synchronized audio stream, and optionally other information such as metadata and/or closed captioning text.

The content stream processing system 114 processes the received media content streams as necessary to prepare them for transmission to a plurality of media devices 106. For example, non-target type commercials or the like may be incorporated with (interspersed within) a particular media content event. Further, the media content event is typically associated with one or more identifiers, such as channel number, program identifier (PID), and/or station call signs identifying the media content provider associated with a particular media content event. The media content is processed into one or more discrete packages of data suitable for serial communication over the broadcast-based communication system 110. An example embodiment processes a stream of media content into a MPEG-2 (Moving Pictures Expert Group) transport stream format, an MPEG-2SD transport stream format, a H.264 transport stream format, or any other suitable transport stream format that enables communication of a stream of media content over the broadcast-based communication system 110. Such formatted content may then be encapsulated into an asset zip file for communication to the media devices 106.

Some media content broadcast facilities 104 receive hundreds, or even thousands, of different streaming media content events from many different content providers. Accordingly, each received stream of media content must be individually processed into a series of discrete data packages for transmission to the plurality of media devices 106.

In some applications, the processed media content streams are further aggregated together for broadcasting by the transport channel system 116. Then, the media content streams may be broadcast to the plurality of media devices 106 over the broadcast-based communication system 110. The broadcast media content is received as a media content stream 108 at each of the media devices 106.

A variety of types of communication systems may be used for the broadcast-based communication system 110 to communicate the media content to the plurality of media devices 106. The broadcast-based communication system 110 may employ a satellite content distribution system 118 wherein an uplink signal 120 is communicated from a ground antenna 122 up to one or more satellites 124. Each of the exemplary satellites 124 broadcast a wireless satellite signal 126 down to a receiver antenna 128 that is coupled to the media device 106. The media device receives the media content stream 108 from the receive antenna 128.

Alternatively, or additionally, the broadcast-based communication system 110 may employ an over the air (OTA) system 130 wherein a wireless signal 132 is communicated to the receiver antenna 128. The media device 106 then receives the media content stream 108 from the receive antenna 128.

Alternatively, or additionally, the broadcast-based communication system 110 may employ a cable system 134 wherein a wire-based signal is communicated using a suitable cable 136 or the like that is coupled to the media device 106. Non-limiting examples of the cable 136 include a fiber optic cable, a coaxial cable, and/or a telephone line.

The media content stream 108 may also be received by the media device 106 in other manners. In an exemplary embodiment, the media content broadcast facility 104 is communicatively coupled to the media device 106 via an exemplary communication system 138. The media content stream 108 may then be received by the media device 106 via a communication link 140 that establishes connectivity of the media device 106 to the media content broadcast facility 104.

An example embodiment of an asset manager 102 comprises a processor system 142, an asset buffer 144, a spooler system 146, and a memory 148. The memory 148 includes regions for the asset management logic 150 and a plurality of asset files i1, i, i+1, i+n. Any suitable memory medium may be used for the asset buffer 144 and/or the memory 148. In some embodiments, the asset buffer 144 is included on a portion of the memory 148. In some embodiments, the asset buffer 144 and/or the memory 148 may be remotely located from the asset manager 102. In alternative embodiments, the asset manager 102 may include other components not described herein, and/or may be integrated with other devices and/or systems.

The processing of target assets is performed by the processor system 142 executing the asset management logic 150. In an example embodiment, the asset management logic 150 is shown as residing in the memory 148. In other embodiments, the asset management logic 150 may reside in other memory media, may be remote from the asset manager 102, and/or may be integrated with other logic. Any suitable processing system and/or device may be used to implement the processor system 142. In alternative embodiments, the processor system 142 may be remote from the asset manager 102, and/or may be used to perform other functions and/or to operate other systems.

In an example embodiment, a plurality of asset producers (AP) 152a-152i communicate target assets (targeted advertisements) to the asset manager 102, via communication links 154. In practice, there may be many thousands of different asset producers that, from time to time, provide target assets that are to be presented to selected users (target users) while they are viewing content provided by the content service provider. The target assets may be communicated to the asset manager 102 using any suitable communication medium. For example, target assets may be provided in an e-mail or other suitable electronic correspondence format. The target assets may be downloaded (pushed and/or pulled) to the asset manager 102 from a web site or the like managed by an asset producer or another organization. Target assets may be provided to the asset manager 102 on a physical medium, such as a compact disc (CD), digital video disk (DVD) or other physical memory medium.

The target assets may also include asset attributes that are used to characterize the particular target asset. Such asset attributes may be compared with user attributes during the process of selecting particular target assets for presentation to particular users. Alternatively, or additionally, asset attributes may be defined by the targeted advertisement delivery system 100.

Preferably, each received target asset is assigned a unique identifier by the asset manager 102. Alternatively, a received target asset may include a unique identifier that is provided by the asset producer.

Further, each target asset has an associated initial presentation time that indicates when the target asset is to be initially presented to a user. For example, a particular target asset (or a plurality of target assets) may be associated with an advertising campaign that is to begin at a specified date and/or time. Further, the advertisement campaign may have a specified end date and/or time, or a specified duration. Since the media content broadcast facility 104 must have access to the target assets prior to the intended time of use of the target assets so that they target assets may be communicated to the media devices 106, the asset producers must provide the target assets to the asset manager 102 in advance to the intended initial presentation time of each target asset. In some situations, the target asset is to be immediately available to the media devices 106 (or at least as soon as possible), and therefore may be assigned the current date or the soonest available date that the target asset may be communicated from the targeted advertisement delivery system 100 to the plurality of media devices 106.

Received target assets, and the associated data, are temporarily stored (buffered) by an example embodiment in the optional asset buffer 144 for further processing. For example, a target asset downloaded from a web site or the like, or received in another electronic medium, is preferably buffered until further processing as described herein is performed on that particular target asset.

The asset manager 102 processes each received target asset based on at least its associated intended initial presentation time. In some embodiments, received target assets are processed on a daily basis, on an hourly basis, or on some other predefined duration or time period. Alternatively, or additionally, received target assets are processed as they are received at the asset manager 102. Alternatively, or additionally, target assets may be processed after a predefined number, volume of content data, or the like, has been accumulated in the asset buffer 144.

The asset manager 102 sorts or otherwise groups target assets based on the intended initial presentation time of each target asset. In an example embodiment, target assets are sorted based on a day (24-hour time period or duration), wherein each day begins at some predefined time of day. The asset manager 102 retrieves a particular target asset from the asset buffer 144 and accesses the associated intended initial presentation time of the retrieved target asset. (Alternatively, the asset manager 102 may process a target asset as it is received, and/or may access a target asset from a physical memory medium.)

For example, a target asset having an intended initial presentation time of five days from the current date is stored into the memory 148. Then, during the immediately preceding day (here, day four from the current date since the intended initial presentation time of that target asset is day five), the target asset may be used to build the asset file (along with all other ones of the received target assets that are also associated with day five). The asset manager 102, at the proscribed day (here, day four), then may optionally format the plurality of day five target assets into one or more asset zip files. The spooler system 146 then spools each generated asset zip file (or the asset files, if not reformatted) to the transport channel system 116. The transport channel system 116 may then communicate the broadcast thematic media content events and the received asset zip file (or asset files, if not reformatted) to the media devices 106.

The generated asset files are conceptually illustrated in FIG. 1 as being stored in the memory 148. Thus, for a current day that the processed target assets are to be communicated, illustrated as the asset file "assets day i" in FIG. 1, the asset file may be retrieved by the asset manager 102 and then optionally reformatted into one or more asset zip files, for communication to the transport channel system 116 by the spooler system 146. Here, the target assets (with their unique identifiers and their optional advertisement attributes) are available at the media devices 106 (here at day i+1).

Conceptually, the previous day i−1 is illustrated as being retained in the memory 148. That is, the asset file "assets day i−1" in FIG. 1 is understood to have been communicated to the media device 106 the previous day. In some embodiments, previously communicated asset files may be erased, overwritten, discarded or otherwise deleted.

In some embodiments, the target assets may be used to generate asset files as far in advance of the intended initial presentation time as desired. For example, the "assets day i+1" in FIG. 1 is understood to be scheduled for broadcast (or communication) to the media devices 106 the following day. Similarly, the "assets day i+n" in FIG. 1 is an asset file that has been generated for future communication to the media devices 106 at a future date "n" days in advance of the current date (wherein "n" is a variable representing a particular day in advance of the current day).

It is appreciated that any suitable duration may be used for defining periods wherein asset files having an intended initial presentation time period in advance of the current period of time may be selected for incorporation into an asset file. For instance, the process of generating and/or spooling asset files (or asset zip files) may be done twice a day (every twelve hours). As another non-limiting example, the process may be performed hourly. Any suitable time period (duration) may be used by the various embodiments.

In the example embodiment of FIG. 1, the asset buffer 144 is illustrated as being a separate memory medium from the memory 148. In some embodiments, the asset buffer 144 and the memory 148 may be implemented using the same memory medium.

In the various embodiments, the received target assets, the associated data, the asset files, and/or the asset zip files may be managed using any type of suitable relational database format. When the received target assets, the associated data, the asset files, and/or the asset zip files are stored in the asset buffer 144, the memory 148 and/or another suitable memory medium, suitable identifiers may be used to track, store, access or otherwise manage each individual piece of data and/or groups of data. For example, asset manager 102 may manage target assets by tracking the assigned target asset identifiers, by tracking memory storage location information (such as, but not limited to, reel and track information), or even another assigned temporary identifier or other information.

Further, it is appreciated by one skilled in the art that another unforeseen advantage of managing target assets using the asset buffer 144 and/or the memory 148 is that prior to generation of an asset file for a particular time period, individual target assets may be added, modified and/or deleted. For example, an asset producer may, at some point in time after providing an initial plurality of target assets associated with a particular advertising campaign, may later decide to add new target assets, cancel the use of previously provided target assets, or even modify the advertising information and/or asset attribute information in a previously provided target asset. The asset manager 102 may receive modification files, modification instructions, modification requests, or the like, and then modify the contents of the asset buffer 144 and/or the memory 148 accordingly so that when the asset files are generated, the most currently available target asset information is used.

FIG. 2 conceptually illustrates a plurality of received target assets 202 that are stored in the asset buffer 144. For example, the asset buffer 144 is illustrated as buffering at least nine target assets 204-220. The non-limiting target assets 204-220 may each contain an asset identifier 222, an intended initial presentation time 224, asset content 220, and asset attributes 228.

Any number of target assets may be stored in the asset buffer 144. Further, after a target asset has been further processed as described herein, that particular target asset may be erased, overwritten, discarded or otherwise deleted from the asset buffer 144.

Each of the target assets stored in the asset buffer 144 have a unique asset identifier 222. For example, the first target asset 204 (illustrated at the top of the asset buffer 144 for convenience), has an asset identifier of "asset ID-1" in FIG. 2. The second target asset 206 is identified as "asset ID-2" in FIG. 2. Later target assets are similarly identified. Any suitable asset identifier may be used to uniquely identify target assets stored in the asset buffer 144.

Each of the plurality of asset files 202 have an associated intended initial presentation time 224. The intended initial presentation time may be any suitable identifier of the day, date, time, or the like that the target asset needs to be available at the media devices 106 for possible presentation to a viewing user. For example, the first target asset 204 has an intended initial presentation time of "date i" in FIG. 2. Target assets 206, 210, 218 and 220 also have an intended initial presentation time that falls within the same time period as the first target asset 204.

One skilled in the art appreciates that the intended initial presentation time of "date i" for the target assets 204, 206, 210, 218 and 220 need not be identical. More specifically, the intended initial presentation time of "date i" represents a time that falls within the time period used by the asset manager 102 for generation of a particular asset file. For example, the asset manager 102 may be configured to process and communicate asset files once per day, such as at 11:59 p.m. Thus, all assets dated for that day between 12:00 midnight and 11:59 p.m. (represented as having the intended initial presentation time of "date i" in FIG. 2, for example) should be processed and communicated together as a group if their times fall within a particular asset file time period. And, in this example embodiment, all target assets for that day (or other predefined asset file time period) are processed and communicated to the media devices 106 one day prior to their specified day (or other predefined asset file time period) in which their intended initial presentation time occurs. Here, the first target asset 204 may have a date of July 15, at 10:00 am. Thus, the first target asset 204 needs to be communicated to the media devices 106 the on at least the prior date of July 14.

Continuing with the hypothetical example above, the second target asset 206 may have a intended initial presentation time of July 15 at noon, the target asset 210 may have a intended initial presentation time of July 15 at 11:58 p.m., the target asset 218 may have a intended initial presentation time of July 15 at 4:00 a.m., and the target asset 220 may have a intended initial presentation time of July 15 at 3:015 p.m. Accordingly, the target assets 204, 206, 210, 218 and 220 should be communicated to the media devices 106 on at least the prior date of July 14. In alternative embodiments, the target assets are communicated more than one day (or other predefined asset file time period) prior to the date of their specified intended initial presentation time.

Similarly, assets dated for the next day between 12:00 midnight and 11:59 p.m. should be processed and communicated together as a group. In the example embodiment of FIG. 2, target assets for that next day (date i+1) are processed and communicated to the media devices one day prior to their specified day in which their intended initial presentation time occurs. Here, the fifth target asset 212 may have a date of July 16, at 10:00 a.m. and the seventh target asset may also have the same date of July 16, yet at another specified time. Thus, the fifth target asset 212 and the seventh target asset 216 need to be communicated to the media devices 106 the on at least the prior date of July 16. Accordingly, they would be communicated to the media devices 106 on July 15.

FIG. 3 conceptually illustrates a plurality of target assets 202 that are selected by the asset manager 102 and then stored in an asset file 302. For example, the asset file 302 is illustrated as storing the above-described target assets 204, 206, 210, 218 and 220 that have their respective intended initial presentation time associated with the presentation period of "date i" in FIG. 2. Any number of selected target assets may be stored in the asset file 302.

In practice, prior to the communication time (associated with a predefined asset file time period) when the target assets in the asset file 302 are to be communicated to the media devices 106, the asset manager 102 searches the asset buffer 144 for those target assets having an intended initial presentation time that falls within the asset file time period. That is, the asset manager 102 searches the asset buffer 144 and moves, copies, transfers or the like all asset files that have their associated intended initial presentation time that falls within the asset file time period of the asset file that is being generated.

Once the asset file has been generated, a predefined number of the target assets (or a number of target assets whose combined amount of data of volume equals, or is slightly less than, a predetermined amount or volume) are then grouped and stored into an asset zip file. That is, the selected target assets are reformatted for communication by the transport channel system 116, and then are spooled out to the transport channel system 116 by the spooler system 146.

In the various embodiments, each generated asset zip file may be configured to hold a predefined number of asset files. For example, an asset file 202 may be limited to one hundred target assets. If a thousand and ten target assets are in an asset file, then eleven asset zip files are generated (ten asset zip files with one hundred target assets each, and one asset zip file with the remaining ten target assets). The eleven asset zip files are then spooled out to the transport channel system 116 by the spooler system 146.

In another embodiment, a maximum amount of data (volume of data) that may be in an asset zip file may be predefined. For example, an asset zip file may be limited to one hundred megabytes of data. Target assets are selected such that their total combined volume is equal to, or is less than, one hundred megabytes (after reformatting into a zip file format). Then, another asset zip file is generated using remaining ones of the target assets of the asset file.

Figure 4:
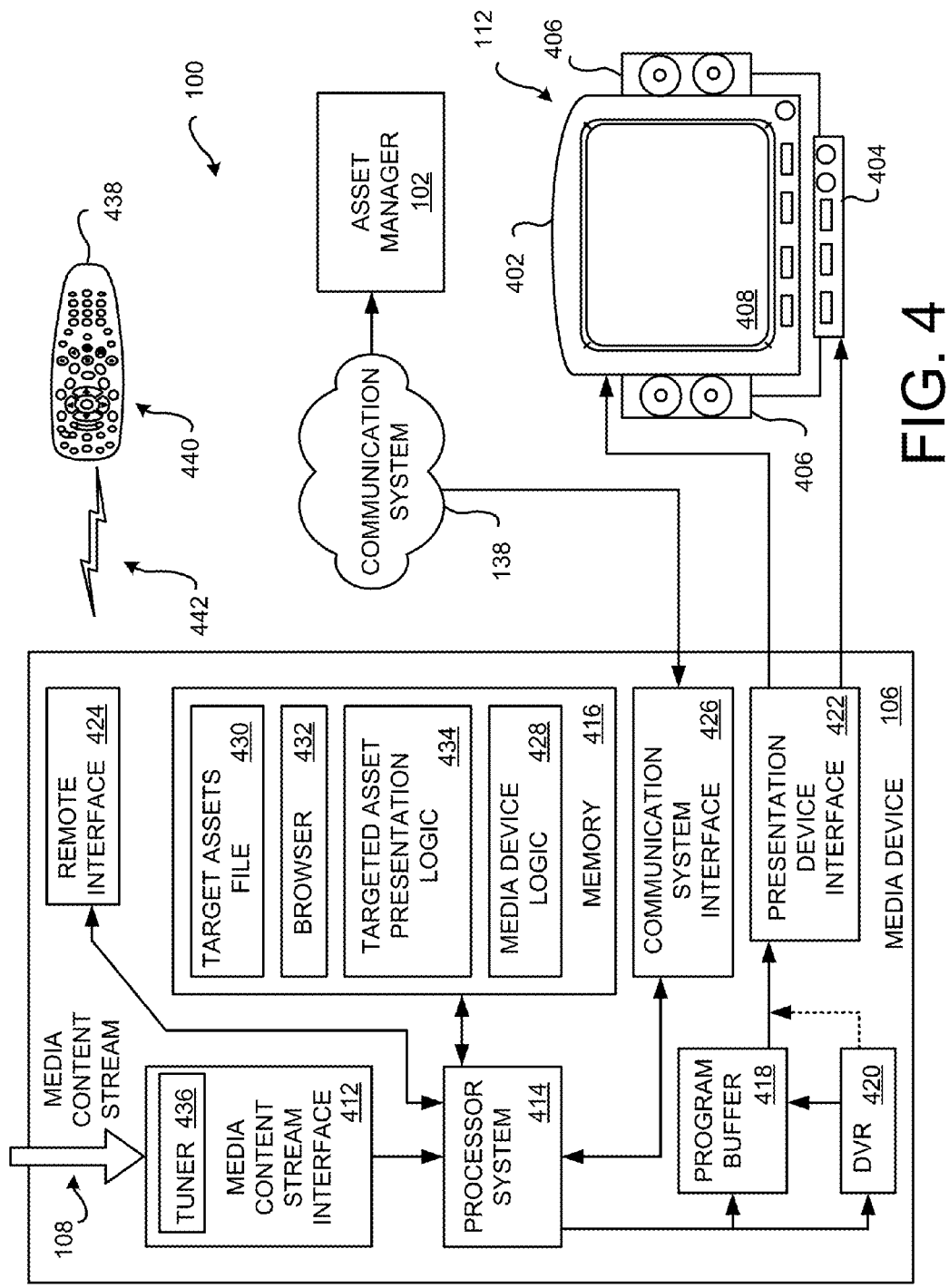
FIG. 4 is a block diagram of an example embodiment of a targeted advertisement delivery system implemented in a media device.

FIG. 4 is a block diagram of an example embodiment of a targeted advertisement delivery system 100 implemented in a media device 106, such as, but not limited to, a set top box (STB). Embodiments of the targeted advertisement delivery system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 108.

The exemplary media device 106 is communicatively coupled to a media presentation system 112 that includes a visual display device 402, such as a television (hereafter, generically a TV), and an audio presentation device 404, such as a surround sound receiver controlling an audio reproduction device (hereafter, generically, a speaker 406). Other types of output devices may also be coupled to the media device 106, including those providing any sort of stimuli sensible by a human being, such as temperature, vibration and the like. The video portion of the media content event is displayed on the display 408 and the audio portion of the media content event is reproduced as sounds by one or more speakers 406. In some embodiments, the media device 106 and one or more of the components of the media presentation system 112 may be integrated into a single electronic device.

The non-limiting exemplary media device 106 comprises a media content stream interface 412, a processor system 414, a memory 416, a program buffer 418, an optional digital video recorder (DVR) 420, a presentation device interface 422, a remote interface 424, and an optional communication system interface 426. The memory 416 comprises portions for storing the media device logic 428, the target assets file 430, an optional browser 432, and the targeted asset presentation logic 434. In some embodiments, the video device logic 428, the browser 432, and the targeted asset presentation logic 434 may be integrated together, and/or may be integrated with other logic. In other embodiments, some or all of these memory and other data manipulation functions may be provided by using a remote server or other electronic devices suitably connected via the Internet or otherwise to a client device. Other media devices may include some, or may omit some, of the above-described media processing components. Further, additional components not described herein may be included in alternative embodiments.

The functionality of the media device 106, here a set top box, is now broadly described. A satellite-based content distribution system 118 (FIG. 1) operated by a media content provider provides media content that is received in one or more multiple media content streams 108 multiplexed together in one or more transport channels. The transport channels with the media content streams 108 are communicated to the media device 106 from the media content broadcast facility 104 operated by the media content provider. Non-limiting alternative examples of such media systems include an OTA system 130, a cable system 134, and/or the Internet.

The one or more media content streams 108 are received by the media content stream interface 412. In a broadcast environment, one or more tuners 436 in the media content stream interface 412 selectively tune to one of the media content streams 108 in accordance with instructions received from the processor system 414. The processor system 414, executing the media device logic 428 and based upon a request for a media content event of interest specified by a user, parses out media content associated with the media content event of interest. The media content event of interest is then assembled into a stream of video and/or audio information which may be stored by the program buffer 418 such that the media content can be streamed out to components of the media presentation system 112, such as the visual display device 402 and/or the audio presentation device 404, via the presentation device interface 422. Alternatively, or additionally, the parsed out media content may be saved into the DVR 420 for later presentation. The DVR 420 may be directly provided in, locally connected to, or remotely connected to, the media device 106. In alternative embodiments, the media content streams 108 may stored for later decompression, processing and/or decryption.

From time to time, one or more asset zip files are received in the media content stream 108. The target assets are unpacked from each received asset zip file by the processor system 414 executing the targeted asset presentation logic 434. The target assets (and optionally their associated asset attributes) are then stored in the target assets file 430. Other information pertaining to the target assets may also be stored. Particular target assets targeted to a viewing user may then be retrieved and presented to a user viewing a media content event that is being presented by the media presentation system 112.

The exemplary media device 106 is configured to receive commands from a user via a remote control 438. The remote control 438 includes one or more controllers 440 disposed on the surface of the remote control 438. The user, by actuating one or more of the controllers 440, causes the remote control 438 to generate and transmit commands, via a wireless signal 442, to the media device 106. The commands control the media device 106 and/or control components of the media presentation system 112. The wireless signal 442 may be an infrared (IR) signal or a radio frequency (RF) signal that is detectable by the remote interface 424.

The processes performed by the media device 106 relating to the processing of the received media content stream 108 and communication of a presentable media content event to the components of the media presentation system 112 are generally implemented by the processor system 414 while executing the media device logic 428. Thus, the media device 106 may perform a variety of functions related to the processing and presentation of one or more media content events received in the media content stream 108.

In some situations, some media devices may be configured to communicatively couple to the communication system 138, via the communication system interface 426. For example, target assets, asset files, asset zip files and/or various supplemental information may be received from the asset manager 102 via the communication system 138. For example, but not limited to, a particular target asset may be configured to be interactive with the user. The user, operating their remote control 438, may then establish a communication link over the communication system 138 to a web site or the like operated by the asset producer of the interactive target asset. The user may then interact with the web site or the like.

It should be emphasized that the above-described embodiments of the targeted advertisement delivery system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of distributing a plurality of target assets to a plurality of media devices, comprising:
   receiving and storing a plurality of first target assets each produced by an asset provider, wherein each of the plurality of first target assets are associated with an intended presentation time period that the corresponding first target asset is to be available to be presented to a user who is viewing a media content event using their media device;
   selecting a plurality of second target assets from the stored plurality of first target assets, wherein the plurality of second target assets have their respective intended presentation time period that begins at a time that is within an asset file time period;
   generating an asset file, wherein the generated asset file includes the plurality of second target assets and is associated with the asset file time period; and
   generating an asset zip file using the asset file, wherein the selected plurality of second target assets are included in the asset zip file, and wherein the asset zip file is formatted into a communication format suitable to broadcast to the plurality of media devices;
   wherein the asset zip file is broadcast concurrently to the plurality of media devices.

2. The method of claim 1, wherein the asset file does not include the other ones of the plurality of first target assets that have their respective intended presentation time period that begins at a time that is not within the asset file time period.

3. The method of claim 1, wherein the asset file time period is a first asset file time period, and further comprising:
   predefining a plurality of asset file time periods, wherein each of the plurality of asset file time periods are defined by at least a start time and at least one of an end time or a duration; and
   selecting one of the plurality of asset file time periods that has a start time that corresponds to a specified time, wherein the selected asset file time period is used to generate the asset file.

4. The method of claim 1,
   wherein each one of the selected plurality of second target assets includes at least one asset attribute that describes at least one characteristic of the advertising content of the second target asset,
   wherein the at least one asset attribute for each of the selected plurality of second target assets is included in the asset zip file that is broadcast to the plurality of media devices, and
   wherein at each one the plurality of media devices, the at least one asset attribute is compared with user attributes associated with the media device to determine if that second target asset is to be selected to be presented by the media device.

5. The method of claim 1, wherein after the asset zip file is generated, further comprising:
   spooling the asset zip file to a transport channel system that broadcasts the spooled asset zip file to the plurality of media devices.

6. The method of claim 1, wherein at least one of the plurality of media devices is a cellular phone equipped with video functionality.

7. The method of claim 4, wherein the presentation time that the selected second target asset is to be presented by the media device is after a start time of the asset file time period of the second target asset.

8. The method of claim 5, wherein the asset file time period associated with the plurality of second target assets is a first asset file time period, wherein the asset file is a first asset file, wherein the asset zip file is a first asset zip file, and wherein after the first asset zip file is generated and then spooled to the transport channel system, the method further comprises:
   selecting a plurality of third target assets from the stored plurality of first target assets, wherein the plurality of third target assets have their respective intended presentation time period that falls within a second asset file time period that is after the first asset file time period;
   generating a second asset file, wherein the generated second asset file includes the plurality of third target assets and is associated with the second asset file time period; and
   generating a second asset zip file using the second asset file, wherein the selected third target assets are included in the second asset zip file, and wherein the second asset zip file is formatted into the communication format suitable to broadcast to the plurality of media devices;
   wherein the second asset zip file is broadcast by the transport channel system to the plurality of media devices.

9. The method of claim 8, wherein the second asset zip file is broadcast to the plurality of media devices after the first asset zip file is broadcast and before the intended presentation time period of the corresponding second target asset.

10. The method of claim 8, further comprising:
    receiving a plurality of fourth target assets each produced by an asset provider, wherein each of the plurality of fourth target assets are associated with an intended presentation time period that is after an end time of the first asset file time period used to generate the first asset file; and
    storing the plurality of received stored fourth target assets as members of the plurality of first target assets,
    wherein the second asset file includes those ones of the plurality of fourth target assets that have their respective intended initial presentation time that falls within a second asset file time period.

11. A method that receives a plurality of target assets that have been distributed to a plurality of media devices, comprising:

receiving, at a media device that is one of the plurality of media devices, an asset zip file with a plurality of second target assets that have been selected from a plurality of first target assets each produced by an asset provider, wherein each of the plurality of second target assets are associated with an intended presentation time period that permits the media device to present a selected one of the second target assets after a start of its corresponding intended presentation time period;

unpacking the received asset zip file to access the plurality of second target assets; and storing the plurality of received second target assets in a memory of the media device, wherein each one of the selected plurality of second target assets includes at least one asset attribute that describes at least one characteristic of the advertising content of the second target asset, and wherein the at least one asset attribute is compared with user attributes associated with the media device to determine if that second target asset is to be selected to be presented by the media device during a commercial break that occurs during the presentation of a media content event.

12. The method of claim 11, wherein the asset zip file with the plurality of second target assets is a first asset zip file, further comprising:

receiving, at the media device after the first asset zip file has been received, a second asset zip file with a plurality of third target assets that have been selected from the plurality of first target assets, wherein each of the plurality of third target assets are associated with an intended presentation time period that permits the media device to present a selected one of the third target assets after a start of its corresponding intended presentation time period;

unpacking the received second, asset zip file to access the plurality of third target assets; and storing the plurality of received stored third target assets in the memory of the media device, wherein each one of the selected plurality of third target assets includes at least one asset attribute that describes at least one characteristic of the advertising content of the third target asset, and wherein the at least one asset attribute is compared with the user attributes associated with the media device to determine if that third target asset is to be selected to be presented by the media device during a commercial break that occurs during the presentation of a media content event.

13. The method of claim 11, wherein receiving the asset zip file comprises:

operating a tuner of the media device to receive a media content stream that is being broadcast to the plurality of media devices over a broadcast-based communication system, wherein the asset zip file resides in the broadcasting media content stream.

14. The method of claim 11, further comprising:

operating a tuner of the media device to receive a media content stream that is being broadcast to the plurality of media devices over a broadcast-based communication system, wherein the received media content stream includes the presenting media content event, and wherein the asset zip file is received from a remote asset manager that is communicatively coupled to the media device via a communication system that is different from the broadcast based communication system.

15. The method of claim 11, wherein the media device is a cellular phone equipped with video functionality.

16. The method of claim 12, wherein storing the plurality of third target assets comprises:

erasing, overwriting, discarding or deleting the previously stored plurality of second target assets from the memory of the media device.

17. A media device that receives a plurality of target assets that have been distributed to a plurality of media devices, the media device comprising:

an interface that receives an asset zip file with a plurality of second target assets that have been selected from a plurality of first target assets each produced by an asset provider, wherein each of the plurality of second target assets are associated with an intended presentation time period that permits the media device to present a selected one of the second target assets after a start of its corresponding intended presentation time period;

a processor system that unpacks the received asset zip file to access the plurality of second target assets; and a memory that stores the plurality of received second target assets in a memory of the media device, wherein each one of the selected plurality of second target assets includes at least one asset attribute that describes at least one characteristic of the advertising content of the second target asset, and wherein the at least one asset attribute is compared with user attributes associated with the media device to determine if that second target asset is to be selected to be presented by the media device during a commercial break that occurs during the presentation of a media content event.

18. The media device of claim 17, wherein the interface is a media content stream interface that comprises:

at least one tuner that is operated to receive a media content stream that is being broadcast to the plurality of media devices over a broadcast-based communication system, wherein the asset zip file resides in the broadcasting media content stream.

19. The media device of claim 17, further comprising:

a media content stream interface that includes at least one tuner that is operated to receive a media content stream that is being broadcast to the plurality of media devices over a broadcast-based communication system, wherein the received media content stream includes the presenting media content event, wherein the interface communicatively couples the media device to a communication system that is different from the broadcast-based communication system.

* * * * *